United States Patent [19]

McCrary

[11] Patent Number: 5,557,474
[45] Date of Patent: Sep. 17, 1996

[54] PASSIVE THERMAL COMPENSATION METHOD AND APPARATUS

[75] Inventor: Donald R. McCrary, Orlando, Fla.

[73] Assignee: Martin Marietta Corporation, Bethesda, Md.

[21] Appl. No.: 451,433

[22] Filed: May 26, 1995

[51] Int. Cl.⁶ ..................................... G02B 7/02
[52] U.S. Cl. ............................. 359/820; 359/819
[58] Field of Search ..................... 359/819, 820

[56] References Cited

U.S. PATENT DOCUMENTS

| | | | |
|---|---|---|---|
| 1,325,936 | 12/1919 | Fouasse . | |
| 2,533,478 | 12/1950 | Lee et al. . | |
| 3,671,108 | 6/1972 | Kilgus | 359/820 |
| 4,303,306 | 12/1981 | Ookawa | 359/819 |
| 4,855,987 | 8/1989 | Versluis | 369/112 |
| 5,146,367 | 9/1992 | Newman | 359/820 |
| 5,210,650 | 5/1993 | O'Brien et al. | 359/820 |
| 5,258,873 | 11/1993 | Mishina et al. | 359/654 |
| 5,283,695 | 2/1994 | Ziph-Schatzberg et al. | 359/820 |
| 5,313,333 | 5/1994 | O'Brien et al. | 359/820 |

FOREIGN PATENT DOCUMENTS 0680532  2/1964  Canada .................. 359/820

Primary Examiner—Loha Ben
Attorney, Agent, or Firm—Burns, Doane, Swecker & Mathis, L.L.P.

[57] ABSTRACT

Unwanted positional shifts between two objects, such as lenses, are precisely compensated during thermal changes by use of a passive mechanical system. Materials with differing coefficients of thermal expansion and angled interfaces transforms a longitudinal dimensional change into a fine transverse dimensional change to precisely control movement as a function of temperature thereby maintaining, e.g., lens focus. Compensation movement can be to reduce or increase the spacing between objects such as lenses during a thermal change.

12 Claims, 3 Drawing Sheets

PASSIVE THERMAL COMPENSATION METHOD AND APPARATUS

BACKGROUND OF THE INVENTION

1. Field of the Invention

The present invention relates to a method and apparatus for passively compensating for thermal expansion and, more particularly, for precisely controlling the spacing between two objects such as lenses throughout a temperature range.

2. Discussion of Related Art

Physical objects undergo changes in dimensions and other characteristics in response to a change in ambient temperature. In some applications, this change can be inconsequential, while with others the change can be quite significant. Dimensional expansion or contraction of a support structure can affect the spacing between two objects in an undesirable manner. For instance, it is well known that the imaging performance of an optical system is dependent on temperature. Increases and decreases in ambient temperature change the physical dimensions of both the lens elements as well as the mechanical components of an optical system. Also, the refractive properties of the lens elements change with changes in ambient temperature.

To address this problem, many solutions have been proposed. For instance, U.S. Pat. Nos. 1,325,936 to Fouasse and 2,533,478 to Lee et al. disclose temperature compensating means for lens mounts which use two materials having different coefficients of thermal expansion. In the Fouasse patent, each lens of a lens system is mounted to a respective tube, one tube being inside the other. Each tube is made of a different material having a different coefficient of thermal expansion such that when the lens system undergoes a temperature change, each tube expands at a different rate. These different rates control the spacing of the two lens elements relative to each other. In these systems, however, the thermal expansion or contraction must be in the direction of the optical axis, which requires relatively large spans of material along the optical axis, making the system bulky and relatively difficult and expensive to manufacture. Furthermore, the lenses must be mounted in a cantilevered fashion, i.e., spaced from the support structure by the respective mounting tubes. This leads to vibration harmonics and other undesirable mechanical affects which tend to deteriorate lens system performance.

The Lee et al. patent discloses selective control of the spacing of a lens group from a surface to maintain the focal point of the lens group at a predetermined position through a temperature change. Again, a cantilevered mounting structure incorporating materials of different coefficients of thermal expansion are used to control the relative spacing of the lens group from its focal plane.

Other systems, such as disclosed in U.S. Pat. Nos. 5,313,333 and 5,210,650 both to O'Brian et al., use a lever action to enhance the amount of movement of the lens relative to the amount of thermal expansion of the mounting structure along the optical axis of the system.

A review of previous passive athermalization optical assemblies reveals that the solutions are bulky, difficult to manufacture and subject to mechanical vibration and other stresses and generally not conducive to practical applications.

Other systems include intervention of positioning means such as lens drive motors and rotational lens mounts wherein focus is maintained through some form of feedback controlling the lens drive, which in turn controls the relative positioning of the lens group to maintain focus. This type of thermal compensation adds greatly to the complexity and weight of the optical system.

SUMMARY OF THE INVENTION

It is an object of the present invention to provide a passive thermal expansion compensating mechanism and method which is compact, easily manufactured and resistant to the affects of mechanical stresses and vibrations.

The present invention includes the features of transforming the thermal expansion or contraction of a member along its radial plane into a motion in a transverse axis, parallel to an optical axis, for example, and orthogonal to the member's radial plane, by providing an angled intersection at an interface of a first member to a second member. As the first member dimensionally changes in the radial plane, the relative positioning of the two angled surfaces of the first and second members changes, thus permitting the transverse spacing between the two members to change and thereby acting as a motion reducer. The system can be advantageously designed to use a difference in coefficients of thermal expansion of the two members to create their relative motion. Because the system does not depend on the thermal expansion in the direction of thermal compensation axis, e.g., the optical axis, but rather translates the motion along the longitudinal direction of the first member, the relative spacing along the transverse axis during a temperature change can be increased, decreased or maintained constant in accordance with the specific application to which the invention is applied.

For instance, one application of the invention is within the optical path of a dual field of view missile seeker. The design will permit both wide field of view (WFOV) and near field of view (NFOV) optical paths to remain parfocalized over a significant temperature range, the temperature range corresponding to the linearity of the coefficients of thermal expansion of the materials used. Other applications will become apparent from the discussion below.

The athermalization device disclosed herein is extremely small and lightweight making it very suitable for the optical system envelope requirements of missile applications.

BRIEF DESCRIPTION OF THE DRAWINGS

The present invention will now be described by reference to specific embodiments in connection with the accompanying drawings, in which.

DETAILED DESCRIPTION OF THE PREFERRED EMBODIMENTS

Figure 1:
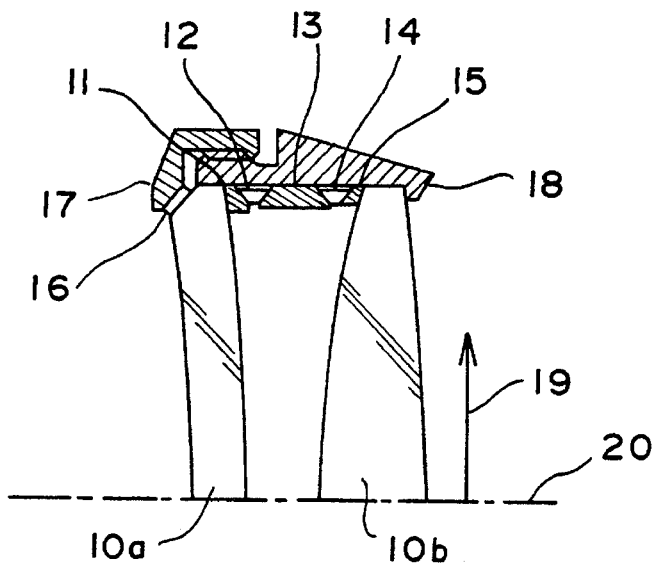
FIG. 1 illustrates a first embodiment of the present invention involving four interfaces and used in a lens mount.
Figure 2:
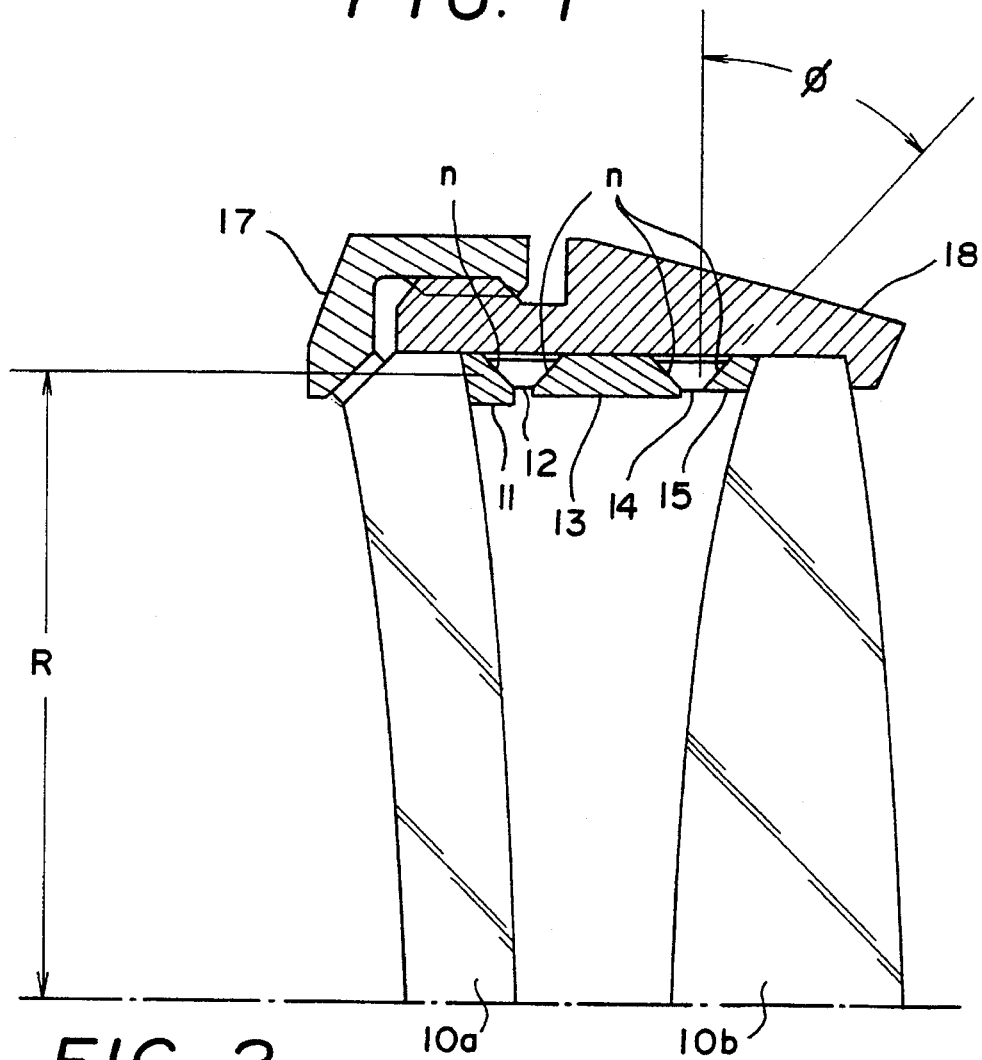
FIG. 2 is an exploded view of FIG. 1 illustrating the four interfaces and the angle formed therebetween.
Figure 3:
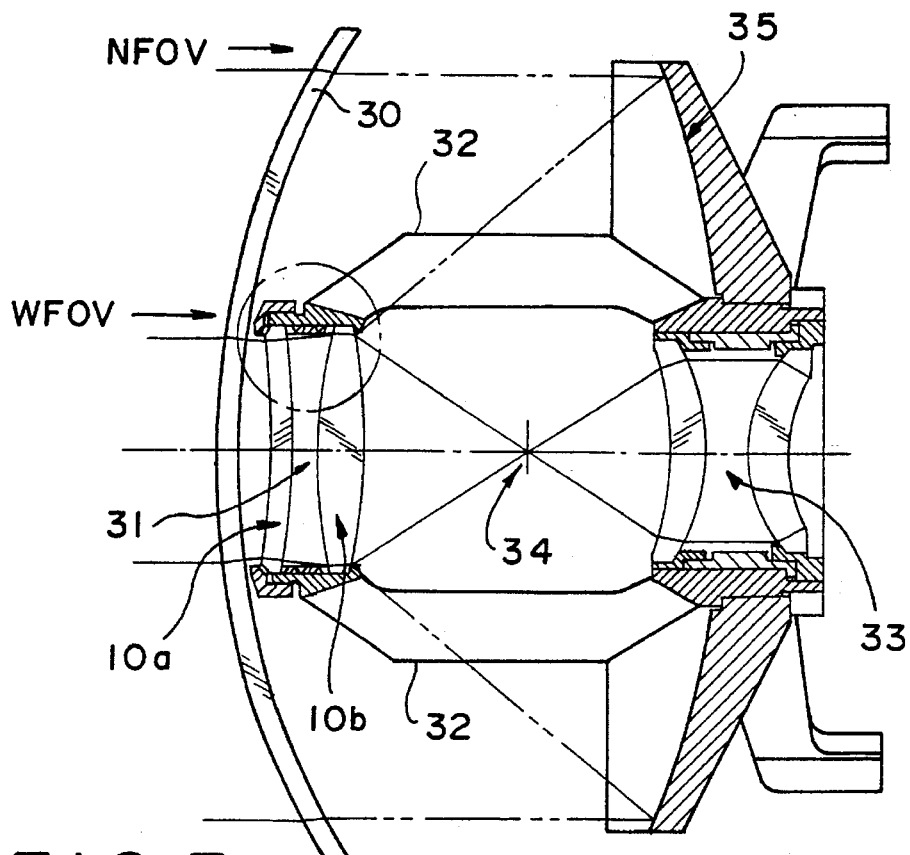
FIG. 3 is a view of the embodiment shown in FIG. 1 used in a forward looking infrared my system suitable for missile application.

By way of example, a dual optical system as shown in FIGS. 1, 2 and 3 will be described as an illustrative embodiment of the present invention.

At room temperature, the illustrated optical system is adjusted so that both narrow field of view (NFOV) and wide field of view (WFOV) images are coincident (parfocalized). Thereafter, as temperature changes, the thermal effects on the optical materials and mechanical components would cause the NFOV and WFOV images to separate absent thermal compensation. As an example, it has been determined for a specific system shown in FIGS. 1, 3 and 3, that in order to adjust for defocus due to thermal changes, the air space between a first lens 1 and a second lens 2 must be varied at a rate of minus 0.007 inch per change of 30° C. along the optical axis 20. This amount of positional shift accommodates various thermal effects including changes in the index of refraction, the lens shape and the relative dimensions of the lens and of various mechanical components.

The negative air space change requirement is precisely accomplished by the present invention by (1) controlling the contact slope angle of each space or interface, (2) determining the number of interfaces, and (3) selecting the materials of proper differing coefficients of thermal expansion (CTE), as will be clear from the following description of the inventive thermal compensation device.

Between lenses 10a and 10b, as shown in FIG. 1, are a series of annular spacers, each spacer having at least one angled side surface. The first, third and fifth spacers 11, 13 and 15, as shown in FIG. 1, are made of a material having a specific CTE. The even spacers 12 and 14 are made of a material having a different CTE. If a negative spacing change (wherein the spaced apart objects get closer as temperature increases) is desired, the odd annular rings 11, 13 and 15 of FIG. 1, should have a smaller CTE value than the matching members even annular rings 12 and 14 of FIG. 1.

For instance, if a negative spacing change is desired, the odd spacers 11, 13 and 15 may be manufactured from a stainless steel alloy having a CTE of $5.5 \times 10^{-6}/°$ F. The even spacers 12 and 14 may be manufactured by ultrahigh molecular weight polyethylene having a CTE of $78.0 \times 10^{-6}/°$ F. This more than tenfold difference in the CTEs leads to selective control of the relative spacing between the lenses.

As the temperature rises, all of the spacers, as well as all of the mechanical elements of the system, expand. However, the even spacers 12 and 14 expand considerably faster than the odd spacers 11, 13 and 15. Being annular rings, the even spacers 12 and 14 move outward relative to the central axis of the optical system faster than the odd spacers 11, 13 and 15. This would permit gaps to form between the spacers, thereby permitting the air space between the lens elements 10a and 10b to be reduced by biasing the lenses and rings together. To assure that the spacers in the lens elements are abutting at all times, a biasing means, such as a load spring, elastic material or other form of passive biasing 16 (including gravity or other form of acceleration if the lens system continuously faces the direction of the acceleration) is used.

To package the lens system, a two-part mount 17 and 18 is used. The two-part mount consists of a first mount or male member 18 through which a bore is formed for holding the lenses 10a and 10b, and the even and odd spacers 11–15. A second mount or female member 17 is screwed over the first mount member 18 to maintain the biasing means 16 such as a load spring or elastic member against the first lens element 10a to assure that the lenses 10a and 10b are not free to move or vibrate while maintaining the abutting relationship of the elements.

If a positive dimensional change is desired, i.e., the lenses 10a and 10b move apart with increased temperature, one need only select materials wherein the even spacers 12 and 14 have a lower coefficient of thermal expansion than the odd spacers 11, 13 and 15.

As shown in FIG. 2, the number of interfaces n and the relative angle ø therebetween can be utilized to control the degree of change in the spacing between the two objects or lenses 10a and 10b. Specifically, the smaller the angle ø between the radial plane 19 and the interface surface, the smaller the degree of change in the spacing. The larger the angle ø, of course, the greater the change in the spacing between the two objects 10a and 10b. However, too steep an angle ø might result in the interfaced surfaces locking together due to their relative coefficients of friction or Brinelling wherein the surface texture of one of the harder material punches into the surface of the softer material. To avoid the necessity of using too steep an angle, one might properly select a greater number n of interfaces, increase the contact radius R or choose other materials having suitable coefficients of thermal expansion.

The interface contact angle of each of the rings may be determined by the following equation.

$$\arctan(\phi) = \frac{-(S - Ld)/n}{Td*(C1 - C2)*R}$$

where:
ø=contact angle
n=number of interfaces
R= contact radius
S=required airspace change over thermal change
Ld= axial expansion of all spacers
Cx=coefficient of thermal expansion of each material, wherein "x" is a number to identify the respective materials.
Td= thermal change With reference to FIG. 2, by solving this equation, a contact angle with 43° at each of the four interfaces will yield minus 0.007 inch axial movement between the first lens 10a and the second lens 10b for a 30° C. temperature change. Table 1, below, illustrates a specific example using delrin™ and stainless steel.

TABLE 1

| phi | 0.73471 | RADIANS | 42.09596 DEGREES |
|---|---|---|---|
| n | 4 | | |
| R | 0.4380 | | |
| S | −0.01300 | | .0126 + .196" cres 304 dewar |
| Ld | 0.00181 | | 0.15700 thick delrin ™ |
| C1 | 0.0000510 | | delrin ™ |
| C2 | 0.0000096 | | cres (re., stainless steel) 304 |
| Td | 226.00 | | F. deg |

All spacer components 11–15 can be housed within a 1.2 inch outside diameter×1 inch inside diameter×0.25 inch volume typical to the application shown. By selecting mixtures of contact angles ø, number of interfaces n, contact radii R and materials having specific CTEs for a given thermal range, a predetermined air space change can be achieved.

With respect to FIG. 3, the system of FIGS. 1 and 2 is positioned inside a forward looking infrared system. As illustrated, a dome 30 protects the optical system, the first lens group 31 of which includes an embodiment of the present invention, as described above. This first lens group 31 is held by a spider, or four radially spaced armatures 32 which position the first lens group 31 from a second lens group 33 which receives the light from the first lens group. As illustrated, the lens groups are focal and include two focal planes, the common focal plane 34 of the narrow field of view (NFOV) and wide field of view (WFOV) being illustrated in FIG. 3.

The NFOV image projects through the dome 30 onto the reflective surface 35 and reflects off the back surface of the second lens 10*b* of the first lens group 31 to form an image on the common focal plane 34. The WFOV image refractively travels through the first lens group 31 to focus on the common focal plane 34. The light, projecting through the common focal plane 34, then projects back through the second lens group 33 to a detector, not illustrated.

Figure 4:
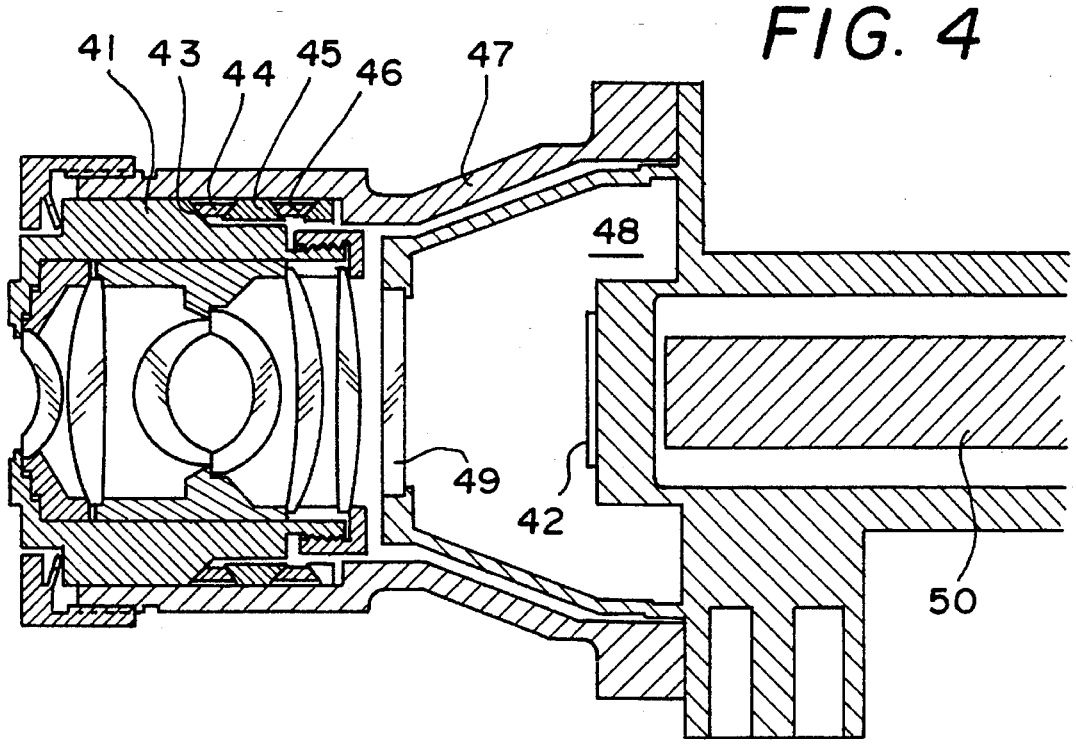
FIG. 4 is a view of a forward looking infrared ray system wherein the invention is used in a different portion of the system to control the positioning of a lens group.

FIG. 4 shows yet another application of the present invention wherein the first lens group 41 is selectively moved during a thermal change to assure that its focal plane coincides with a focal plane array 42. In this embodiment, the mount 43 for the first lens group 41 forms one of the surfaces of an interface between it and an annular ring 44, which abuts a second annular ring 45 made of a material having a different coefficient of thermal expansion. A third annular ring 46 made of the same material as the first annular ring 44 is also included to interface between the second annular ring 45 and an angled surface of the lens group mount 47. The first lens group 41 is thereby controllably displaced relative to a Dewar cavity 48 which is a space cryogenically cooled for maximizing the efficiency of the focal plane array 42. A window 49 is interposed to maintain the integrity of the cold vessel 48. Behind the focal plane array 42 is the cold finger 50 used in cryogenically cooling the focal plane array 42.

In the embodiment shown in FIG. 4, the relative position of an entire lens group 41 is controlled during a temperature change. Naturally, it is possible to use the present invention to shift the lens group 41 and nest another thermal compensation device in accordance with the present invention within that lens group 41 to selectively control the spacing of various lenses within the lens group 41. In other words, the embodiments of FIGS. 1–3 and FIG. 4 can be combined.

Figure 5:
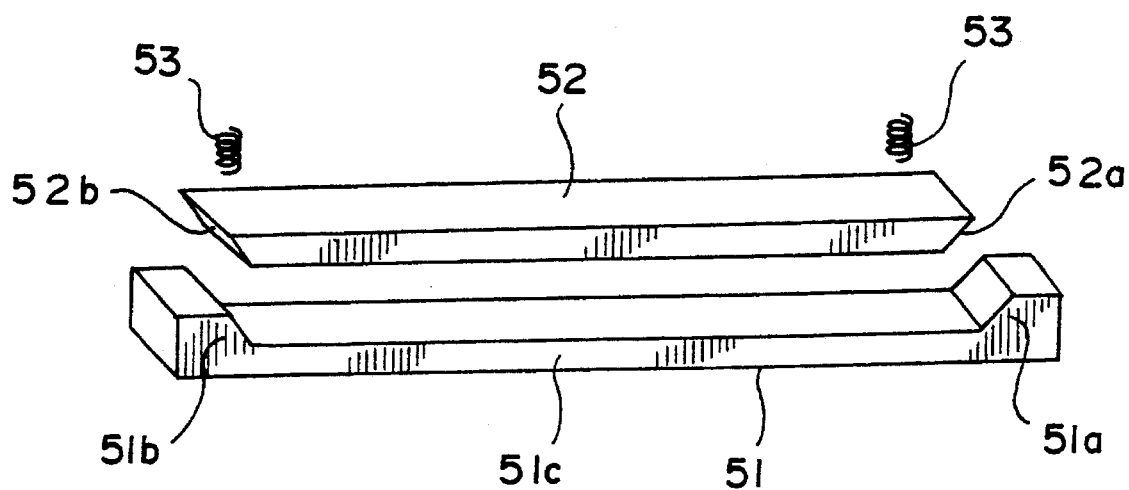
FIG. 5 is a second embodiment of the present invention including a bar shaped member.

It is noted that annular rings are used in the above specific embodiments because of the necessity of permitting light to pass through the center thereof. However, in a second embodiment of the present invention, as shown in FIG. 5, an annular structure is not used. Rather, the first member 51 is of a bar shape, the terminal ends 51*a* and 51*b* of which have surfaces forming an angle relative to the longitudinal dimension of the bar structure 51. This angled surface 51*a* of the bar 51 intersects with a similarly angled surface 52*a* of a second member 52. The first member 51 and the second member 52 control the spacing between two objects, not shown. The relative longitudinal motion of the first member 51 controls a relative position of the second member 52, thereby controlling the spacing between the two objects. The first member 51 includes a fixed portion 51*c*, the distance between the angled surface 52*b* of the second member 52 and this portion 51*c* being relatively fixed (undergoing little dimensional change relative to the change in length of the first member 51) through a thermal change. This portion 51*c* can be fixed to some dimensionally more stable object or can represent the center portion of the member 51, as shown in FIG. 5. Again, biasing means 53, such as springs or elastic materials, is applied to maintain contact between the intersecting surfaces. This embodiment can be useful, as can the first embodiment, for such applications as precise calibrators or controlling the spacing between a detector and a specimen, for example.

Figure 6:
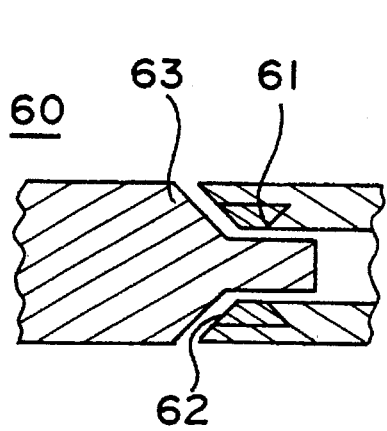
FIG. 6 is a third embodiment of the present invention involving a pin valve.

FIG. 6 shows yet another specific application of the present invention, in this case involving a pin valve. Pin valves 60 are commonly used, for instance, in gas transfer systems which undergo dramatic thermal shifts as the gas passes or does not pass through the pin valve. A change in temperature might affect the relative spacing between the valve and the valve seat which could be compensated for through a conventional feedback system. However, the present invention avoids the necessity of such a feedback system by, for instance, providing an annular ring 61 at the valve seat 62 wherein the annular ring 61 has a coefficient of thermal expansion relative to a needle valve body 63 such that the spacing is controlled through the temperature change. For instance, as the pressure in the gas diminishes, the temperature increases due to gas expansion (according to the well known equation $PV=nRT$) which, to assure a constant amount of gas molecules passing through the valve, would require some compensation in the relative spacing between the valve and the valve seat. This can be accomplished by the present invention.

Figure 7:
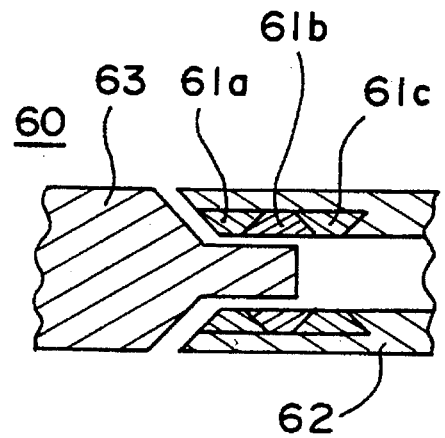
FIG. 7 is a fourth embodiment of the present invention involving a pin valve.

FIG. 7 illustrates a slightly more complicated version of FIG. 6 wherein a plurality of annular rings 61*a*, 61*b*, 61*c* are used so as to increase the relative axial displacement of the angled surface relative to the longitudinal dimension of the annular rings thereby controlling the gap between the valve and the valve seat through a temperature change. The same criteria in selecting the various dimensions, angles, and materials is the same as discussed above.

The invention also is useful in laser applications such as a laser beam source molecule comprising a semiconductor laser diode. For systems using semiconductor laser diodes, there is an additional temperature dependency in that the emitted wavelength is a function of the ambient temperature. The wavelength variations affect the imaging performance of the system that depend on the relationship of refractive index to the wavelength. Furthermore, in non-solid state lasers, the relative distance between the reflective surfaces in the laser cavity is required to be precise so as to achieve the lasing effect. The present invention can insure the dimensional spacing of these reflective surfaces through a thermal shift and by selective control of the angle interfaces, materials, radiuses or the longitudinal dimension and number of surfaces, the present invention can control or maintain the relative spacing between these reflective surfaces.

As will be appreciated by the above, the present invention has advantages over the prior art such as avoidance of the prior art's use of precision slide mechanisms to move lenses or focus lenses which are motor driven mechanisms using a thermocouple/position servo feedback loop. The present invention avoids these bulky and difficult to package systems which also normally require tight tolerances in order to avoid image degradations and boresight errors.

The present invention described herein can be virtually packaged within existing optical envelopes, for example, resulting in no or little additional system weight or volume. The invention is totally passive, requiring no electronic inputs or feedback, and therefore improves reliability and maintenance.

Other applications of the present invention should be apparent to those skilled in the art. The above description is illustrative and should not be construed as limitative. Variations on the specific embodiments shown should present themselves, such as but not limited to selecting more than two materials each having different CTEs, using more than one angle of interface, using materials having varying CTEs which would result in a greater number, albeit more complicated, solutions. Other embodiments and applications of the invention will present themselves to a reader skilled in the art, the present invention having broad application to any device dimensionally sensitive to thermal changes. The scope of the invention should be determined by the claims appended hereto.

I claim:

1. A device comprising:

a first member having a plane and a transverse axis orthogonal to said plane, a dimension of said first member along said plane being larger than a width of said first member along said transverse axis, said first member including at least one angled surface forming a first angle with said plane;

a second member including an least one surface forming a second angle with said plane of said first member, said at least one angled surface of said first member abutting said at least one angled surface of said second member; and biasing means for biasing said angled surfaces of said first and second members together, wherein during a temperature change said dimension of said first member changes according to a coefficient of thermal expansion of at least said first member such that said angled surfaces of said first and second members are displaced relative to one another thereby displacing said first and second members relative to one another along said transverse axis by operation of said angled surfaces.

2. A device according to claim 1, wherein said first member has the shape of an annular ring and said dimension is a radius of said first member, said at least one angled surface of said first member being an outer side surface of said first member.

3. A device according to claim 2, wherein said second member has the shape of an annular ring, a dimension of which is a radius, said at least one angled surface of said second member being an outer side surface of said second member, and wherein said coefficient of thermal expansion of said first member is different than a coefficient of thermal expansion of said second member.

4. A device according to claim 1, wherein said first and second members are in contact with a first and a second object, respectively, the spacing between which is to be controlled during a temperature change, and wherein said coefficient of thermal expansion of said first member is different than a coefficient of thermal expansion of said second member.

5. A device according to claim 4, wherein said second member is wedge shaped and attached to said second object.

6. A device according to claim 5, wherein said first and second objects are a valve and a valve seat.

7. A device according to claim 1, further comprising:

a third member including an least one angled surface forming an angle with said radial plane of said first member, said first member including a first and a second angled surfaces, said second angled surface abutting said at least one angled surface of said third member, wherein said coefficient of thermal expansion of said first member is different than a coefficient of thermal expansion of said third member.

8. A device according to claim 7, wherein said first, second and third members have shapes of annular rings, said angled surfaces of said first, second and third members being located at outer side surfaces of said first, second and third members, respectively.

9. A device according to claim 8, wherein said second and third members are in contact with a first and a second object, respectively, the spacing between which is to be controlled during a temperature change.

10. A device according to claim 9, wherein said first and second objects are lenses.

11. A device according to claim 1, wherein said first member has the shape of a bar and said dimension is a length of said first member, said at least one angled surface of said first member being located spaced from a portion of said first member a location of which does not significantly change relative to said at least one angled surface of said second member during a temperature change.

12. A method of designing a thermal compensation device, comprising the steps of:

determining a desired amount of change in spacing between two objects during a thermal change;

selecting materials, contact radii, angles of contact, and number of interfaces of at least two abutting, coaxial annular rings according to the equation $$\arctan(\phi) = \frac{-(S - Ld)/n}{Td*(C1 - C2)*R}$$

where:

$\phi$=contact angle n=number of interfaces

R= contact radius

S=required airspace change over thermal change

Ld= axial expansion of all spacers

Cx= coefficient of thermal expansion of each material, wherein "x" is a number to define the respective materials Td=thermal change wherein coefficients of thermal expansion of at least two of said rings are different from each other.

* * * * *